US008352128B2

(12) United States Patent
Stocker et al.

(10) Patent No.: US 8,352,128 B2
(45) Date of Patent: Jan. 8, 2013

(54) DYNAMIC PROTECTIVE ENVELOPE FOR CRANE SUSPENDED LOADS

(75) Inventors: David G. Stocker, Roanoke, VA (US); Michael G. Bartel, Roanoke, VA (US)

(73) Assignee: TMEIC Corp., Roanoke, VA (US)

( * ) Notice: Subject to any disclaimer, the term of this patent is extended or adjusted under 35 U.S.C. 154(b) by 642 days.

(21) Appl. No.: 12/567,001

(22) Filed: Sep. 25, 2009

(65) Prior Publication Data

US 2011/0076130 A1 Mar. 31, 2011

(51) Int. Cl.
*G06F 7/70* (2006.01)

(52) U.S. Cl. ........... 701/50; 212/272; 212/273; 212/276

(58) Field of Classification Search .................. 212/270, 212/276, 277, 280, 81, 84, 243; 701/50
See application file for complete search history.

(56) References Cited

U.S. PATENT DOCUMENTS

| | | | | |
|---|---|---|---|---|
| 4,932,541 | A * | 6/1990 | Belsterling | 212/308 |
| 5,491,549 | A * | 2/1996 | Wichner et al. | 356/141.2 |
| 5,642,822 | A * | 7/1997 | Monzen et al. | 212/275 |
| 5,729,453 | A * | 3/1998 | Lee et al. | 701/50 |
| 5,907,111 | A * | 5/1999 | Josten et al. | 73/866.5 |
| 6,648,156 | B1 * | 11/2003 | Bryfors et al. | 212/270 |
| 6,968,963 | B1 * | 11/2005 | Zakula et al. | 212/270 |
| 2005/0173364 | A1 * | 8/2005 | Spohler et al. | 212/270 |
| 2005/0281644 | A1 * | 12/2005 | Lussen et al. | 414/403 |
| 2007/0023377 | A1 * | 2/2007 | Abel et al. | 212/270 |
| 2008/0068585 | A1 * | 3/2008 | Yoshino et al. | 356/5.01 |
| 2009/0088979 | A1 * | 4/2009 | Koch | 701/224 |

* cited by examiner

*Primary Examiner* — Michael Mansen
*Assistant Examiner* — Nathaniel Adams
(74) *Attorney, Agent, or Firm* — Woods Rogers PLC; Peter E. Rosden

(57) ABSTRACT

A system and method for using a gantry crane to efficiently and safely transport loads such as containers and ship hatch covers from one location to another along a known path while avoiding collisions between the loads and obstructing objects which may be situated in the known path. A transceiver emitting laser beams may be used to establish both the position of the spreader and its load and the profile of the known path. Continuous comparisons are made by computer between the location of a dynamic digital protective envelope constructed around the crane spreader and its load, if any, and a digital representation of the profile of the known path to be traveled by the spreader and its load, if any. In the event, the comparison indicates intersection of the protective envelope and the path profile, a speed limit is imposed on the motor controlling the movement in the X axis of the trolley or in the Z axis of the spreader, as required to prevent a collision.

8 Claims, 10 Drawing Sheets

DYNAMIC PROTECTIVE ENVELOPE FOR CRANE SUSPENDED LOADS

TECHNICAL FIELD

The subject invention relates generally to a system and method for use in comparing the positions of two objects and regulating the speed of the first of these objects which is mobile as it is brought into close proximity with the second immobile object. More particularly, this invention may be used in loading and unloading shipping containers with a mobile crane structure by sensing the position of a crane spreader mechanism relative to a container or other object as it approaches the container from an overhead position and imposing a speed limit on the hoist and/or trolley as the spreader approaches a container.

BACKGROUND OF THE INVENTION

Automatic container handling is typically accomplished by means of a crane having a generally rectangular shaped movable trolley located on a repositionable frame. A generally rectangular shaped spreader is used both to move containers onto a stack located on the ground or on a ship beneath the frame and to pick up target containers from such a stack. Spreader is typically connected to trolley by means of cables for raising and lowering the spreader. Crane operators are often located in a cabin more than 100 feet above the pick-up and drop-off point for the containers. Efficient operations call for relatively fast raising and lowering of the spreader mechanism with the hoist. However, due to the distances involved and the physical positioning of the spreader and container, the operators are frequently unable to personally see the container which they are handling or the target area for the spreader. Consequently, they must rely on either their own visual memory or signals from others located at the pick-up or drop-off point to manually reduce the speed of the spreader mechanism. If the spreader speed is reduced too soon, the operating cycles becomes over-extended, i.e. too much time transpires resulting in inefficient and more costly operation cycles. If the spreader speed is reduced too late, a hard landing may occur causing damage to the spreader, a ship hold or hatch, the crane operating mechanism and/or the target container. Common industry experience indicates that over 50% of container handling crane maintenance costs and down time are due to spreader repair What is needed, therefore, is a system and method for regulating the speed of a spreader as it is lowered into position to either pick-up or drop-off a container and which is equally functional in the lanes between crane legs, in the back reach.

SUMMARY OF THE INVENTION

This invention relates to a computerized system for using a crane to transport loads having known dimensions from one location to another along a known path. The crane typically has a boom located above the known path, a trolley movably attached thereto and a spreader flexibly attached to the underside of the trolley. Movement of the trolley and the spreader are typically controlled by separate motors. A transceiver for sending and receiving pulses at a known speed is attached to the trolley, while a structured target is attached to the top surface of the spreader. The method relates to a process for avoiding collisions between the load and any objects situated in the known path. A first dynamic two-dimensional, rectangular digital representation in the X and Z axes of the spreader and any load attached thereto is constructed and stored in the computer. This first representation is the dynamic protective envelope for the spreader and its load, if any. Then, a second digital two-dimensional representation of a profile of the known path in the X and Z axes is constructed by the computer by determining the distance from the transceiver to the path along its length based on the angle of transmission of each pulse and the time until a reflection of that pulse, if any, is received. Thereafter, a third digital, two-dimensional representation in the X and Z axes is constructed by the computer of the location of the first representation relative to both the trolley and the second representation. As the spreader and its load, if any, are transported towards a destination point along the known path according to one or more speed commands, the dimensions of the first representation in the X and Z axes are dynamically adjusted according to the velocity of the trolley and the spreader to account for the sway and the stopping distance in each of the X and Z axes of the spreader and its load, if any. If a comparison of the second representation with the third representation indicates an intersection between the two representations, a collision is imminent and a speed limit is imposed one or both of the motors, as needed, to prevent a collision. When the comparison no longer indicates an intersection, one or both motors are instructed to resume their prior speed until the destination point is reached.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

Figure 1:
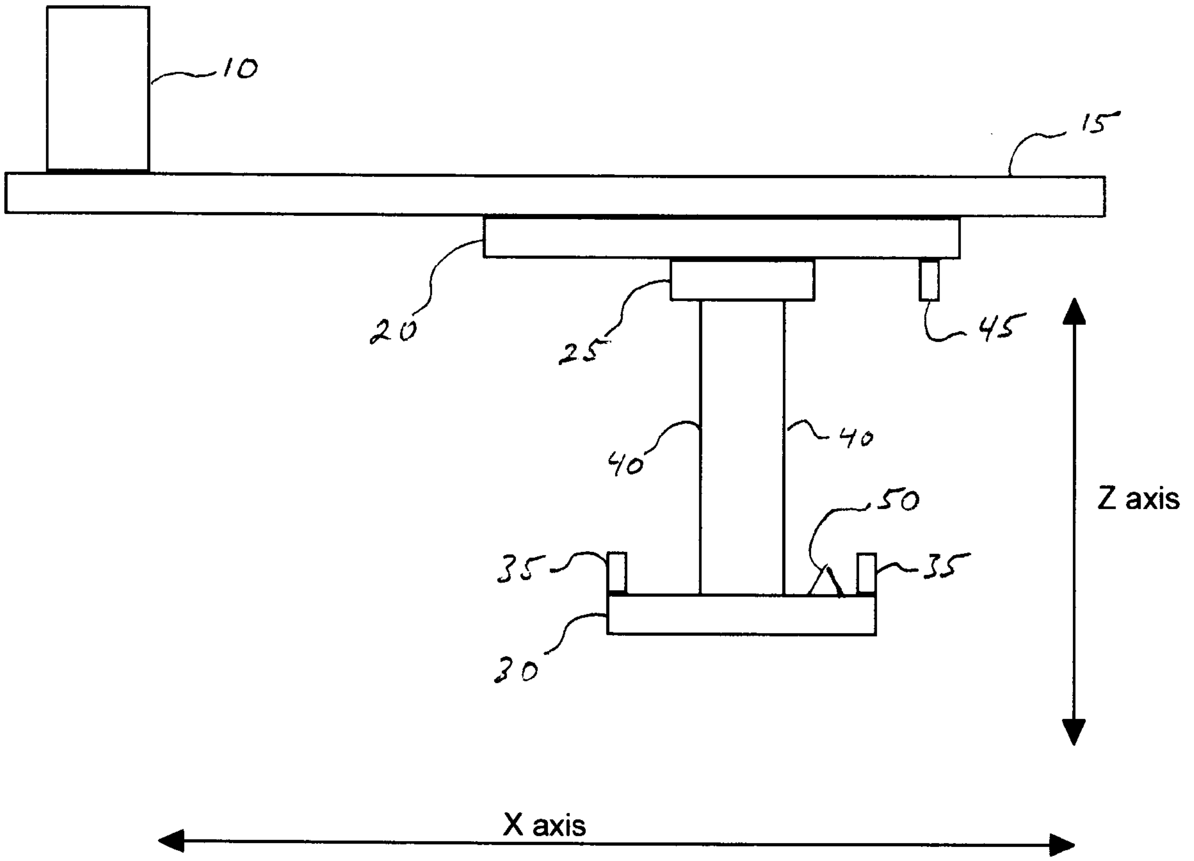
FIG. 1 is an illustration of a flat view of the basic components of a gantry crane.

A gantry crane is typically used for loading and unloading containers located both on deck and in storage holds of ships as well as in on-shore holding yards. FIG. 1 presents a schematic view of the typical main components of such a gantry crane as used in this invention. These components are cabin 10 for housing crane controls, computer equipment including a processor, data storage device and display device and the crane driver or operator, boom 15, trolley 20 horizontally movable along boom 15, hoist 25 attached to trolley 20, spreader 30 having loading flippers 35 of a type known in the industry located at least at each corner thereof which spreader is affixed to hoist 25 typically with wire ropes 40, chains or other similarly flexible means, at least one laser scanner 45 functioning as a transceiver mounted on trolley 20 approximately 9 feet in front of spreader 30 and at least one prism-shaped laser target 50 mounted on the top of the head block of spreader 30. Trolley 20 moves in an X axis parallel to the ground along boom 15 while hoist 25 moves up and down along a Z axis perpendicular to the ground. Movement of the trolley in a Y axis which would be to the left and right of boom 15 is not relevant to this invention. Note that other technologies including, but not limited to, radar and sonar could be adapted for use in the system of this invention in place of laser scanner 45.

Figure 2A:
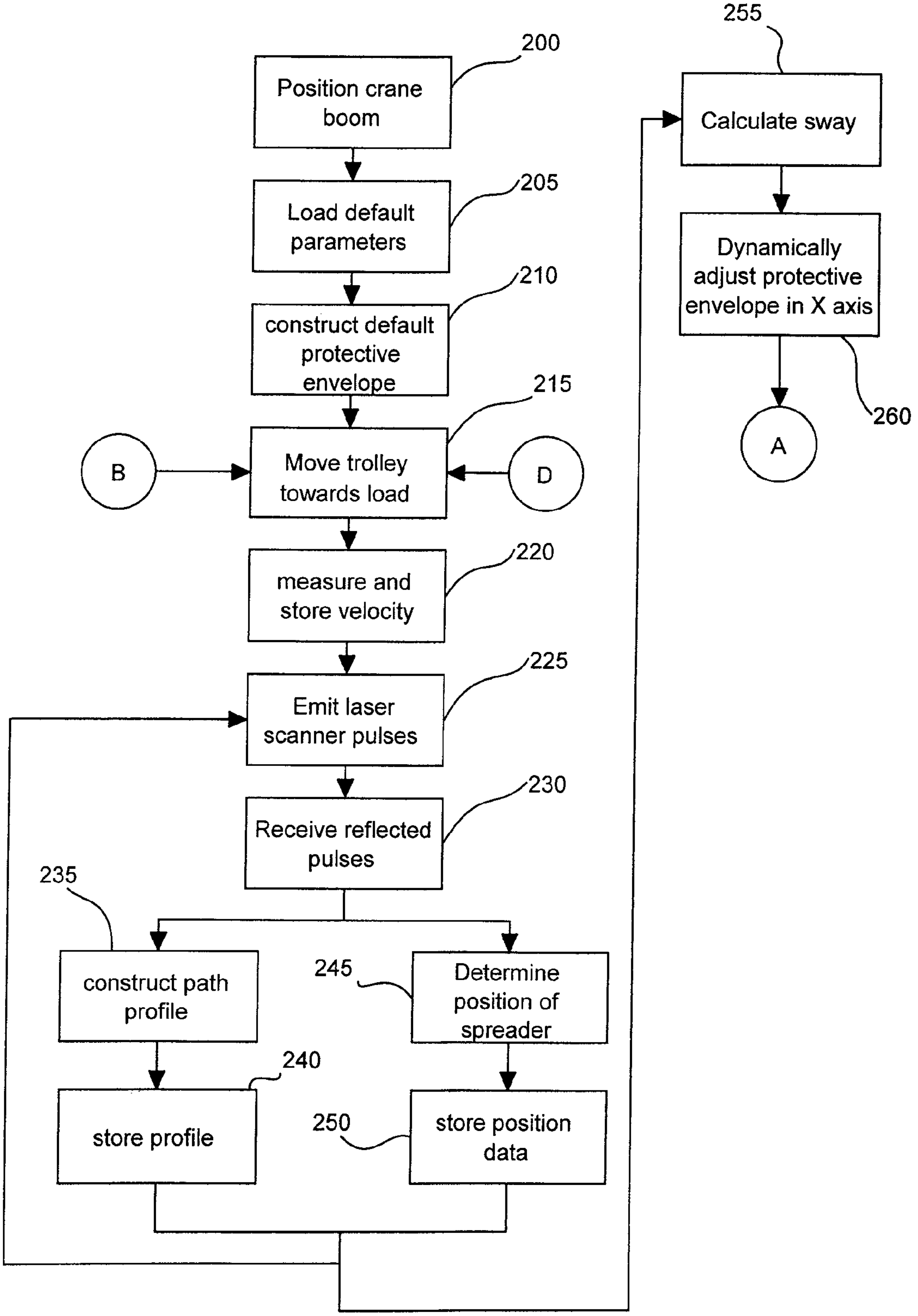
FIGS. 2A and 2B are block diagram illustrations of the process by which a trolley and spreader are prepared for load pickup.
Figure 2B:
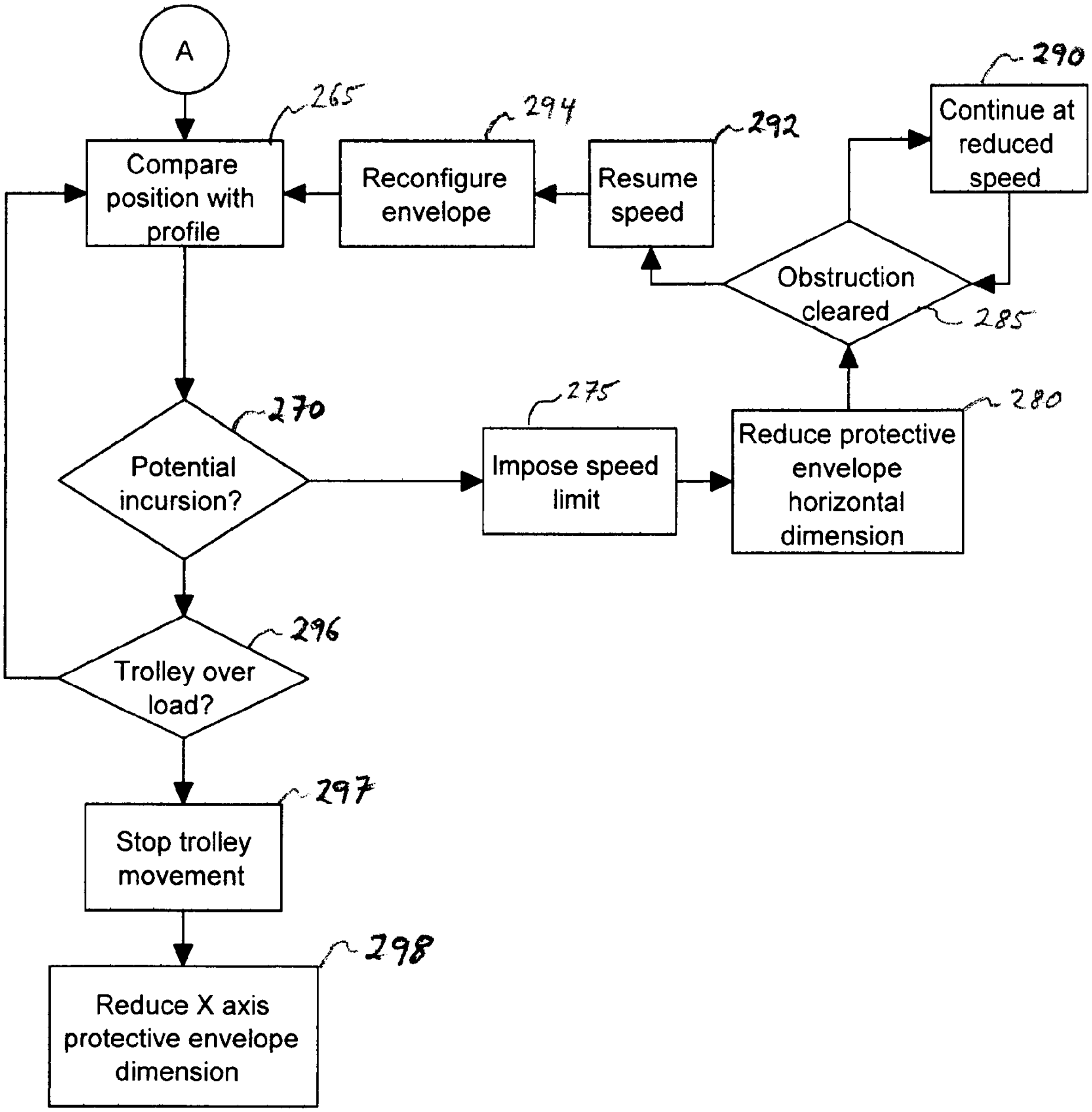

Reference is now made to FIGS. 2A and 2B which show in block diagram form the process by which equipment for moving a suspended load is prepared for load pickup. At 200, the gantry crane is positioned so that boom 15 extends over the location of containers which are to be transported from one location to another. These containers may be stacked on the deck of a ship, below deck in a storage area covered by a hatch or in an on-shore yard. The length dimension of the containers or hatch covers runs in the previously defined Y axis. A set of default parameters is loaded into the controlling computer system at 205. The computer means needed to implement the method of this invention when used in a container loading environment may be located on the crane gantry. The computer means is typically a PC-compatible computer having at least a 600 MHz CPU, 512 MB of RAM and at least 5 GB of memory on a hard drive or other similar device as well as a display device. The aforementioned parameters are the dimensions of the container(s) to be picked up, a signal indicating whether a load is locked onto spreader 30, the final landing speed and the stopping distance margin. The transportation industry presently employs containers having lengths of 20, 40 or 45 feet although the method of this system can be modified to handle containers or other loads having different dimensions. The final landing speed is the lowest speed limit that is applied by system which is typically approximately 9% of full speed. The final landing speed is not set to zero since the operator must eventually land spreader 30. In addition, using 9% of full speed provides compensation for any calculation, measurement, or synchronization errors. The stopping distance margin is the final distance permitted between spreader 30 plus its load or spreader 30 alone and the profiled target destination if the final landing speed were set to zero. This stopping distance margin effectively provides a small margin that reduces sensitivity to small errors in measurement or timing. A typical value is 0.5 meters. Based on these initial default parameters, at 210 the computer system constructs a first digital representation of an initial default two-dimensional rectangular protective envelope, discussed in greater detail below with reference to FIG. 5, which equals, in the X axis, the width of spreader 30 plus the width of the load, if any, attached to spreader 30 and, in the Z axis, the height from the top to the bottom of spreader 30 plus the height of the load, if any, attached to spreader 30. When a loading operation commences, the driver at 215 causes trolley 20 to move in the X axis along boom 15 by issuing a speed command to the trolley motor. Alternatively, the operator may simultaneously cause the spreader to move downward or upward by issuing a further speed command to the hoist motor. When movement of trolley 20 commences, its velocity begins to increase from zero towards its maximum capable velocity. This velocity is continuously monitored and stored at 220. Whenever the crane is in service, laser scanner 45 emits pulses towards target 50 and the ground at 225 and receives pulses reflected from the ground and objects below spreader 30 at 230.

The time lapses between initial transmission of pulses at a known speed and receipt back of reflected pulses are used to derive distance and location data relative to scanner 45 and target 50. The method and type of apparatus employed using scanner 45 and target 50 to obtain this data are disclosed in co-pending U.S. patent application Ser. No. 12/110,327 which is incorporated fully by reference herein. This data is used for two purposes. First, at 235, an accurate two-dimensional profile in the X and Z axes, as defined above, of the area below spreader 30 along the path of boom 15, or a second digital representation, is constructed from this data representing the distance between spreader 30 and all objects residing below spreader 30 including the ground, target loads and any other intervening objects such as ships or buildings. For purposes of this disclosure, a load may be a container, a ship hatch cover or any other object transportable by a gantry crane. Laser scanner 45 employed in this invention can scan beneath it both ahead and behind its perpendicular position above ground level by approximately 90 degrees in each direction for a total arc of 180 degrees although this arc may be made smaller if desired. Furthermore, laser scanner 45 has a range of approximately 80 meters down including up to about 20 meters below the waterline of a vessel within a ship hold. These distances may be increased or decreased either by adjustments to laser scanner 45 or by using a laser scanner having different specifications. The profile is stored in memory at 240, but is also updated as necessary by returning to 225 for continuous scanning while loading and unloading operations are in process. Second, at 245, the position of spreader 30 at all times relative both to trolley 20 and to the path profile in the X and Z axes is calculated as a third digital representation and then stored in memory at 250. Note that both the path profile and the spreader position are determined by use of a single laser scanner. As a result, the necessity to have some means to adjust and align different frames of reference if two or more scanners were used is avoided thereby further simplifying the system and making it both more precise and more economical.

As the motor controlling trolley 20 initiates forward movement and increases velocity along boom 15, trolley 20 travels somewhat ahead of spreader 30 since spreader 30 is connected to trolley 20 by flexible wire ropes 40 or the like, and a potential for swaying motion in the X axis is imparted to spreader 30.

The calculation of the stopping distance (S) is made using the standard equations of linear motion:

$$S = \frac{(v_1^2 + v_0^2)}{2a}$$

Where:

S=Stopping distance [meters]

$V_1$=Current (initial) speed [meters/second]

$V_0$=Final speed [meters/second]

a=Acceleration rate [meters/second$^2$]. This is a constant parameter in the configuration of the motor drive system for the hoist or trolley motor control.

As the final speed $V_0$ is to be zero, the equation is simplified to:

$$S = \frac{v_1^2}{2a}$$

This same equation is used to calculate the stopping distance for both hoist and trolley motor control, except, in the case of trolley motor control, the current spreader sway displacement from the centerline (resting position) is added to the stopping distance. The extent of this sway depends on the size and weight of spreader 30 and the velocity with which it is moving at any point in time. The velocity of trolley 20 in the X axis is a further parameter which is continuously measured and provided to the computer at 220, as described above. These parameters are used by the computer system to calculate on a continuous basis the outer limits of the sway of spreader 30 in the X axis at 255 which calculation is then used to dynamically modify the dimension in the X axis of the protective envelope at 260 making it large enough that a reduction in trolley speed to a specified limit will avoid causing spreader 30 to sway forward beyond the forward border of the protective envelope. Furthermore, the stored path profile is continuously compared with the positional borders of the protective envelope at 265 to determine at 270 if there is a potential for an incursion by an object in the path profile into the perimeter of the protective envelope, and, if so, the forward horizontal velocity of the motor controlling trolley 20 is limited sufficiently at 275, as determined by the computer, to avoid any collision between spreader 30 and any such object. The speed limit is a deceleration rate imposed on the trolley motor (or the hoist motor, as described below) which ensures that motion of the spreader will be stopped within the stopping distance, as defined by the formula provided above, thereby keeping the spreader and its load, if any, within the protective envelope. As the speed limit is implemented, the protective envelope horizontal dimension is appropriately reduced at 280 in the case where a speed command was given only to the trolley motor. If a further speed command was given to the hoist motor, the protective envelope vertical dimension is also appropriately reduced Until the obstruction is cleared, as determined at 285, movement of trolley 20, and potentially hoist 25, continues at the reduced speed at 290. Otherwise, the speed of the motor controlling trolley 20, and potentially the motor controlling hoist 25, is resumed at 292 together with appropriate reconfiguration of the protective envelope at 294. Once trolley 20 has traveled along boom 15 and arrived at a position above a load which is to be transported, as determined by the operator at 296, the trolley movement along boom 15 in the X axis is discontinued by the operator at 297. Alternatively, the system could be modified so that a yard map containing specific locations of containers could be loaded as an initial parameter so that movement of the trolley could be totally automated. After trolley 20 is stopped at the pickup location at 297, the swaying motion along the X axis of spreader 30 gradually diminishes causing a still further concurrent maximum reduction in the dimension along the X axis of the protective envelope as calculated by the computer at 298. Such sway dampening results either from operator control of the trolley speed so as to "catch" and quickly dampen the sway or from one of many known automated sway dampening techniques.

Figure 3:
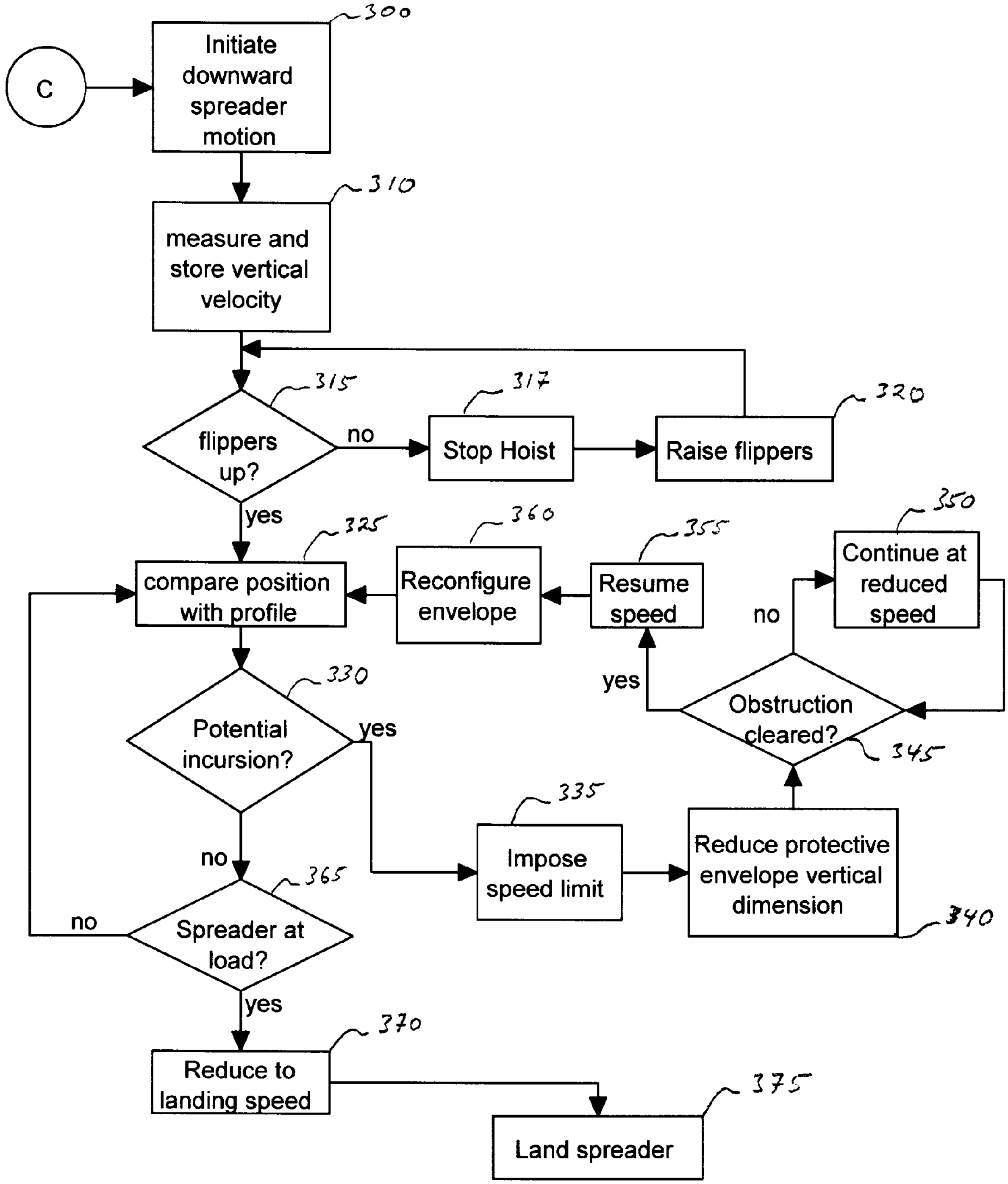
FIG. 3 is a block diagram illustration of the process by which a spreader is lowered to pick up a load.

The load retrieval and transportation process is described with reference to FIG. 3. The continuous pulse emissions from scanner 45 are used both for creating a path profile and for providing spreader 30 position data. Once trolley 20 has reached the load location, the crane driver issues a speed command to the motor controlling hoist 25 at 300 to lower spreader 30 towards the ground, ship hold or container stack to pick up a new load with empty spreader 30. The vertical velocity with which the hoist is travelling down is measured, stored and continuously updated by the computer system at 310. As spreader 30 descends towards the target load, an electronic circuit check is performed to verify that the spreader flippers 35 are in the "up" position at 315. Flippers 35 must be in the "up" position before spreader 30 enters below deck storage cells on a ship in order to avoid potentially knocking flippers 35 off of spreader 30. If they are not, the hoist motor is stopped at 317 and the flippers are raised and downward motion resumed at 320. Furthermore, as spreader 30 descends, the stored path profile is continuously compared with the positional borders of the protective envelope at 325 to determine at 330 if there is a potential for an incursion by an object in the path profile into the perimeter of the protective envelope, and, if so, the downward vertical velocity of the motor controlling hoist 25 is limited sufficiently at 335, as determined by the computer at 330, to avoid any collision between spreader 30 and any such object. As the speed limit is implemented, the protective envelope vertical dimension in the Z axis is appropriately reduced at 340. Until the obstruction is cleared, as determined at 345, movement of spreader 30 continues at the reduced speed at 350. Otherwise, the speed of the motor controlling hoist 25 is resumed at 355 together with appropriate reconfiguration of the protective envelope at 360. When spreader 30 has descended sufficiently far to reach the stopping distance to the load, as determined by a comparison with the path profile at 365, downward velocity is brought to the final landing speed at 370 so that the operator may land spreader 30 on to the target load at 375. Otherwise, the descent continues with further checking positional checking at 325.

Figure 4A:
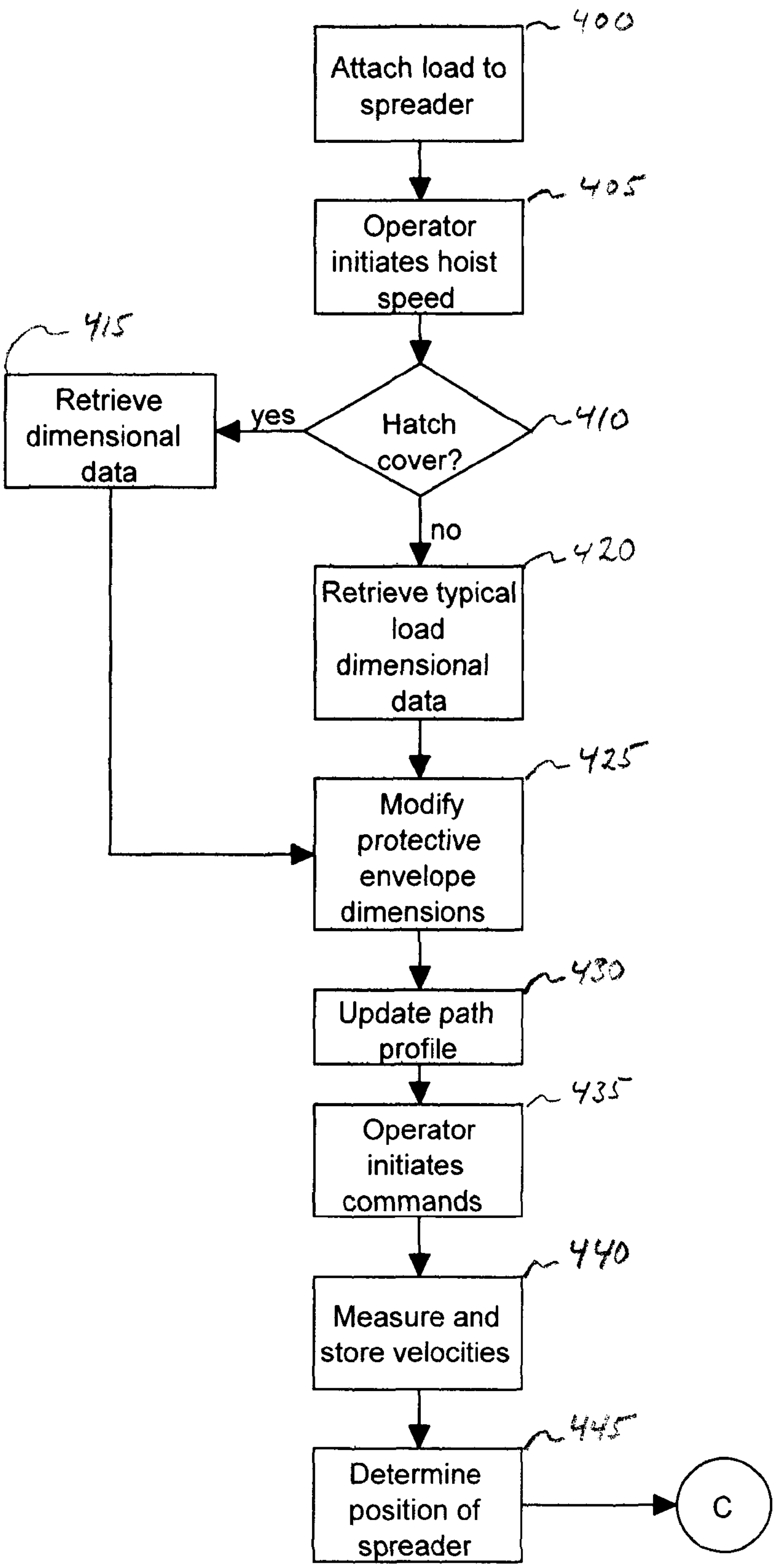
FIGS. 4A and 4B are block diagram illustrations of the process by which a spreader transports a suspended load to an unloading destination and deposits it at that destination.
Figure 4B:
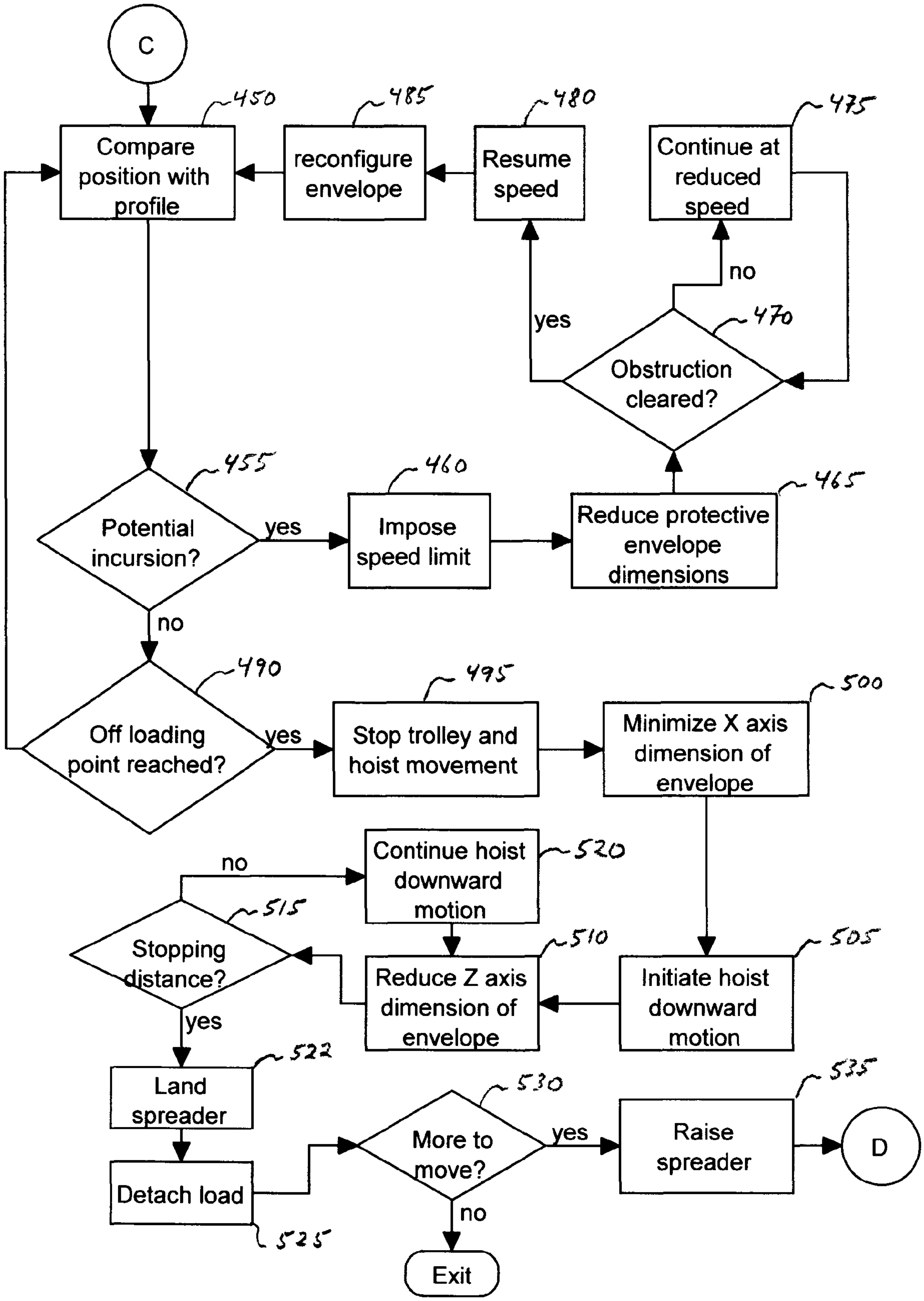

Referring now to FIGS. 4A and 4B, after spreader 30 is brought into contact with the target load, it is attached to that load at 400. In the event a container is the load, flippers 35 are lowered and guide spreader 30 onto the edges of the container, whereas in the case of a hatch cover, flippers 35 remain in the "up" position and twist locks projecting from spreader 30 are inserted into and manually locked into oval holes in the hatch cover. As the operator initiates an upward speed reference at 405, a determination is made at 410 whether the load is a hatch cover or a container. This determination is made based on reflected pulses from scanner 45 indicating whether the load extends beyond or hangs over the edges of spreader 30. A hatch cover is typically about 8 feet wider in the X axis, as defined above, than spreader 30. If such a "hang over" is detected, the dimensions of a hatch cover are retrieved from memory at 415. Otherwise, the dimensions of the type of container being transported are retrieved at 420. The protective envelope is then modified by the computer with the appropriate dimensional data corresponding to either a hatch cover or another target load such as a container at 425 so that it encompasses the load attached to spreader 30. Once envelope reconfiguration is complete, transport may resume. Since reconfiguration of the envelope occurs simultaneously with initiation of upward spreader movement, there is no noticeable hesitation in the movement of spreader 30. Note also that as soon as a load in a column is lifted by the hoist, the path profile is automatically adjusted at 430. In the case of a hatch cover, the path profile must be adjusted to account for the location of any containers positioned a below deck storage cells beneath the hatch cover. Thus, when upward movement of a hatch cover commences, a first distance in the Z axis between spreader 30 and scanner 45 is determined as previously described, and the path profile is adjusted to indicate that that first distance is the deck height and that the top of a container load in the below deck storage cell extends to just below that first distance. For transporting further container loads, if any, after the first one from a below deck storage cell, the system compares the spreader position in the Z axis to the deck height and, if spreader 30 has passed below the deck height plus a threshold value which is typically equal to approximately 3 meters, the hoist motor controlling the movement of spreader 30 is stopped so as to prevent any further downward motion until a further electronic verification is obtained that flippers 35 are in the "up" position after which downward motion resumes until the spreader is landed on and secured to a container load.

The crane operator can then initiate discretionary transport commands causing further hoisting and/or trolley movement at 435. As spreader 30 moves, its horizontal and vertical velocity are constantly monitored and stored at 440 and used, together with pulse data from scanner 45, to continuously determine the position of spreader 30 and its load, if any, at 445. The computer system continuously compares the updated path profile with the positional periphery of the protective envelope at 450. If an obstruction impinges on the protective envelope, as determined at 455, speed limits are imposed on either one or both of the motors controlling hoist 25 and trolley 20 at 460 sufficient to avoid a collision between the detected obstruction and spreader 30 and/or its load. A speed limit is imposed on the motor controlling hoist 25 if the potential collision would result from an impingement along the vertical (Z axis) perimeter of the protective envelope, while a speed limit is imposed on the motor controlling trolley 20 if the potential collision would result from an impingement along the horizontal (X axis) perimeter of the protective envelope. As the speed limits are implemented, the protective envelope dimensions are appropriately reduced at 465. Until the obstruction is cleared, as determined at 470, movement of spreader 30 continues at the reduced speed at 475. Otherwise, the speed of the motors controlling hoist 25 and trolley 20 are resumed at 480 together with appropriate reconfiguration of the protective envelope at 485.

Positional comparison at 450 continues until the operator decides at 490 that trolley 20 has arrived over the load destination point, the movement of trolley 20 is stopped at 495. Since the cessation of horizontal movement by trolley 20 concurrently reduces sway, the dimension in the X axis of the protective envelope is also reduced at 500. Deposit of the load is then initiated by starting downward hoist movement at 505. As spreader 30 with its load approaches the deposit location, the profile of which is derived from the stored path profile, the downward velocity is reduced by the operator and the Z axis dimension of the protective envelope is concurrently reduced at 510. If the load has not reached the stopping distance margin, as determined at 515, downward motion of the hoist continues at 520. Otherwise, the load is landed by the operator at 522 after which it is detached at 525 either by raising flippers 35 in the case of a container or by turning the twist locks holding spreader 30 in place in the case of a hatch cover. If there are more loads to move, as determined at 530, spreader 30 is raised at 535 and the process continues at 215. Otherwise, the process is exited.

Figure 5A:
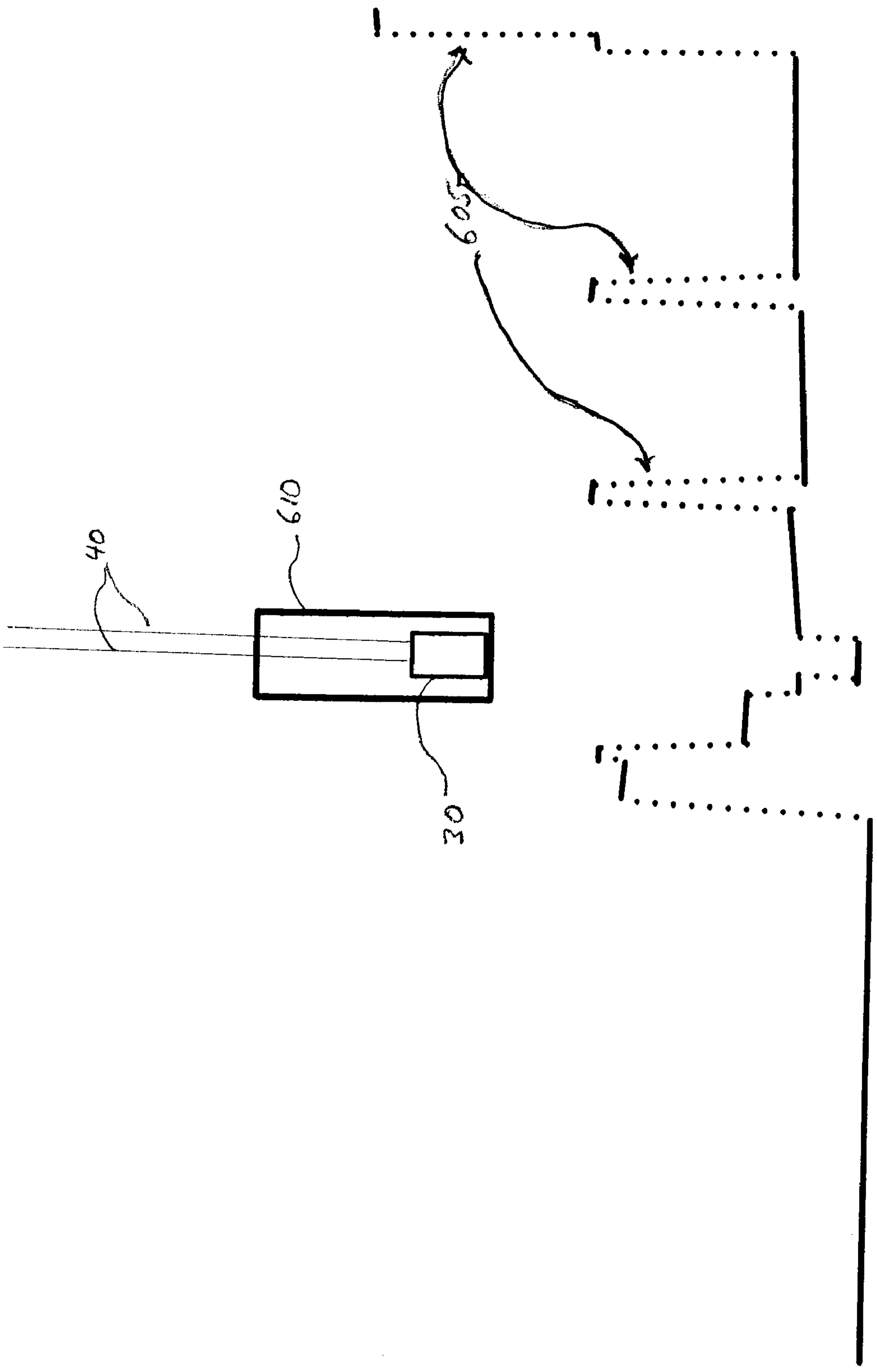
FIGS. 5A, 5B, 5C and 5D illustrate the appearance of a protective envelope around a spreader in various stages of load transportation.
Figure 5B:
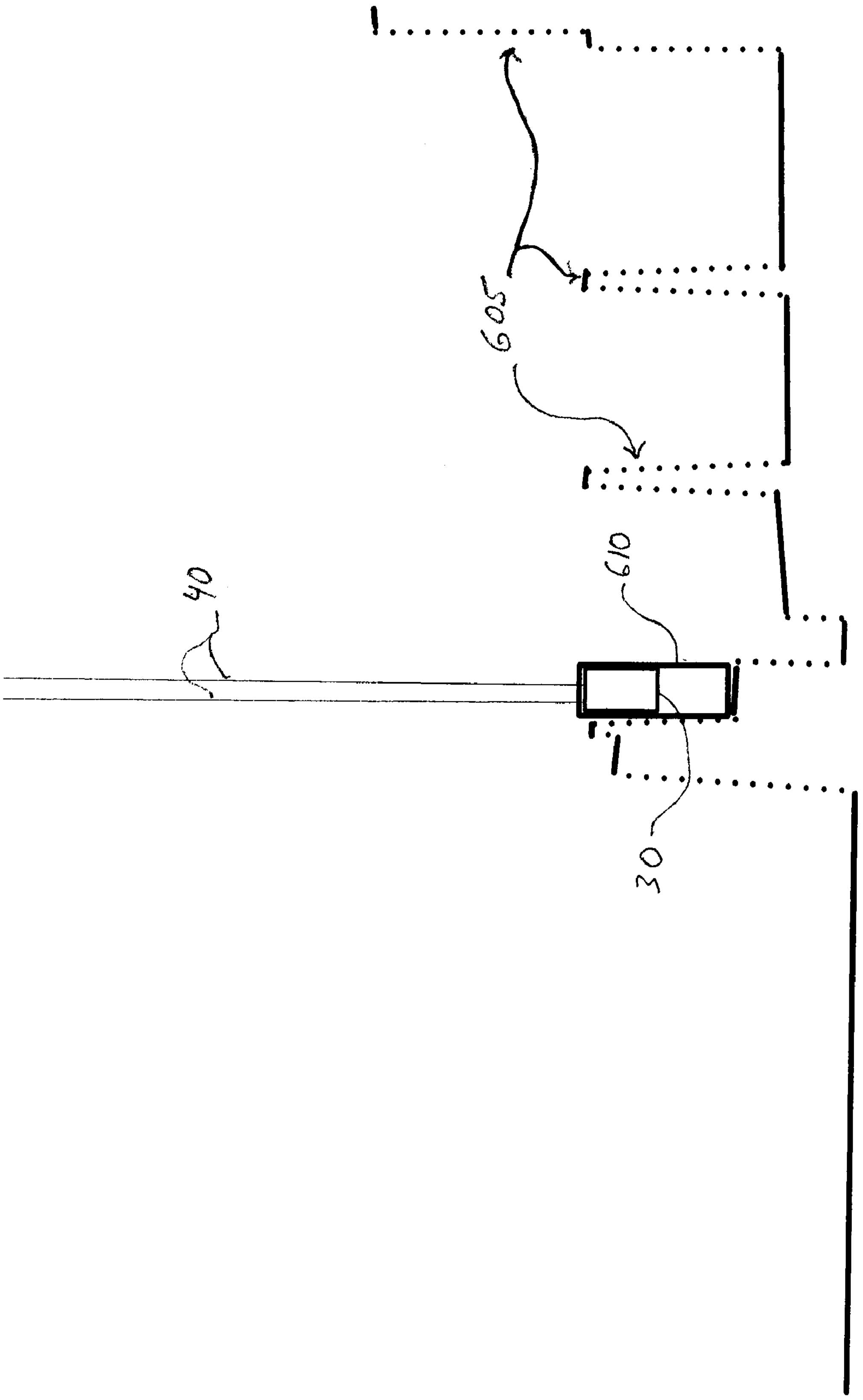
Figure 5C:
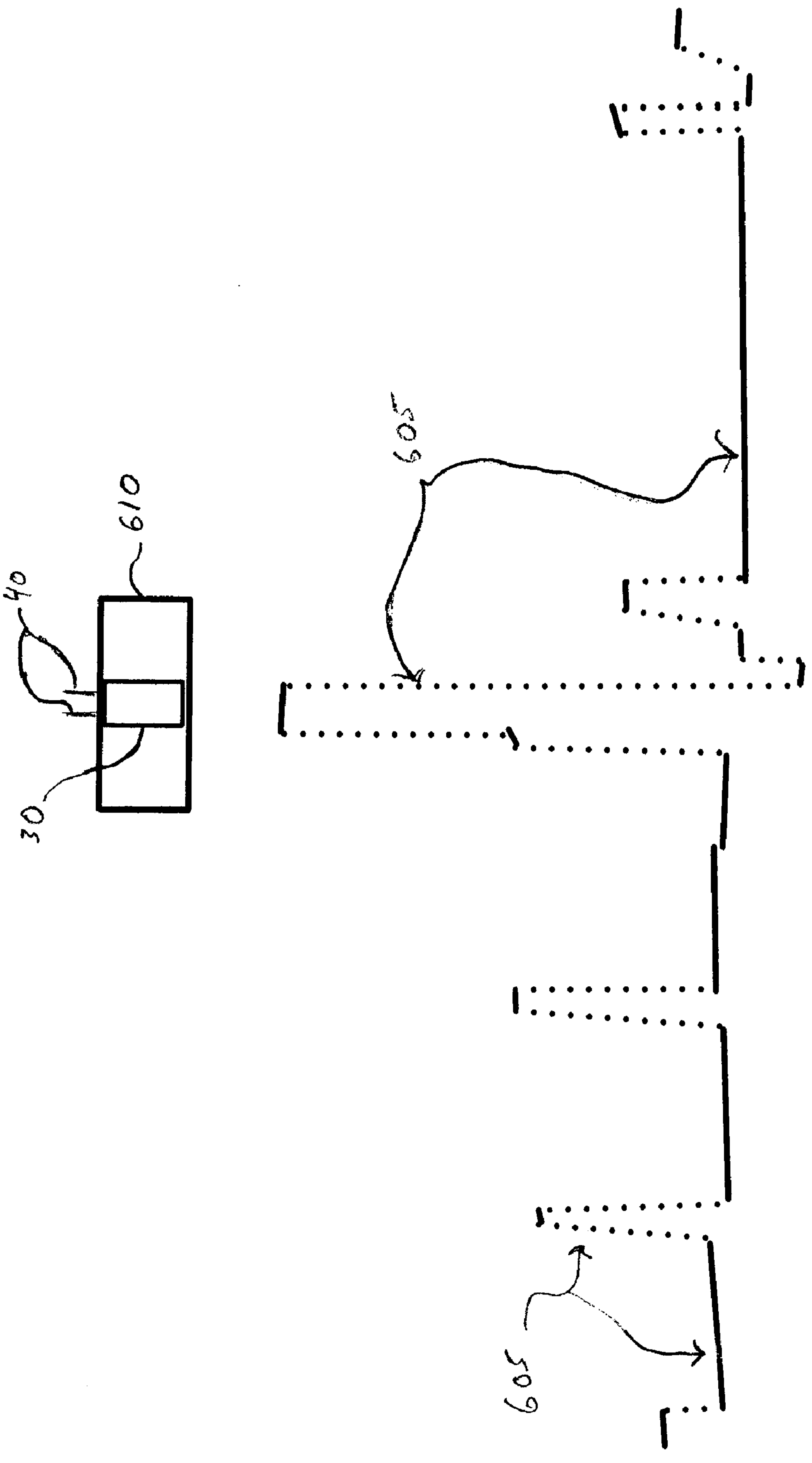
Figure 5D:
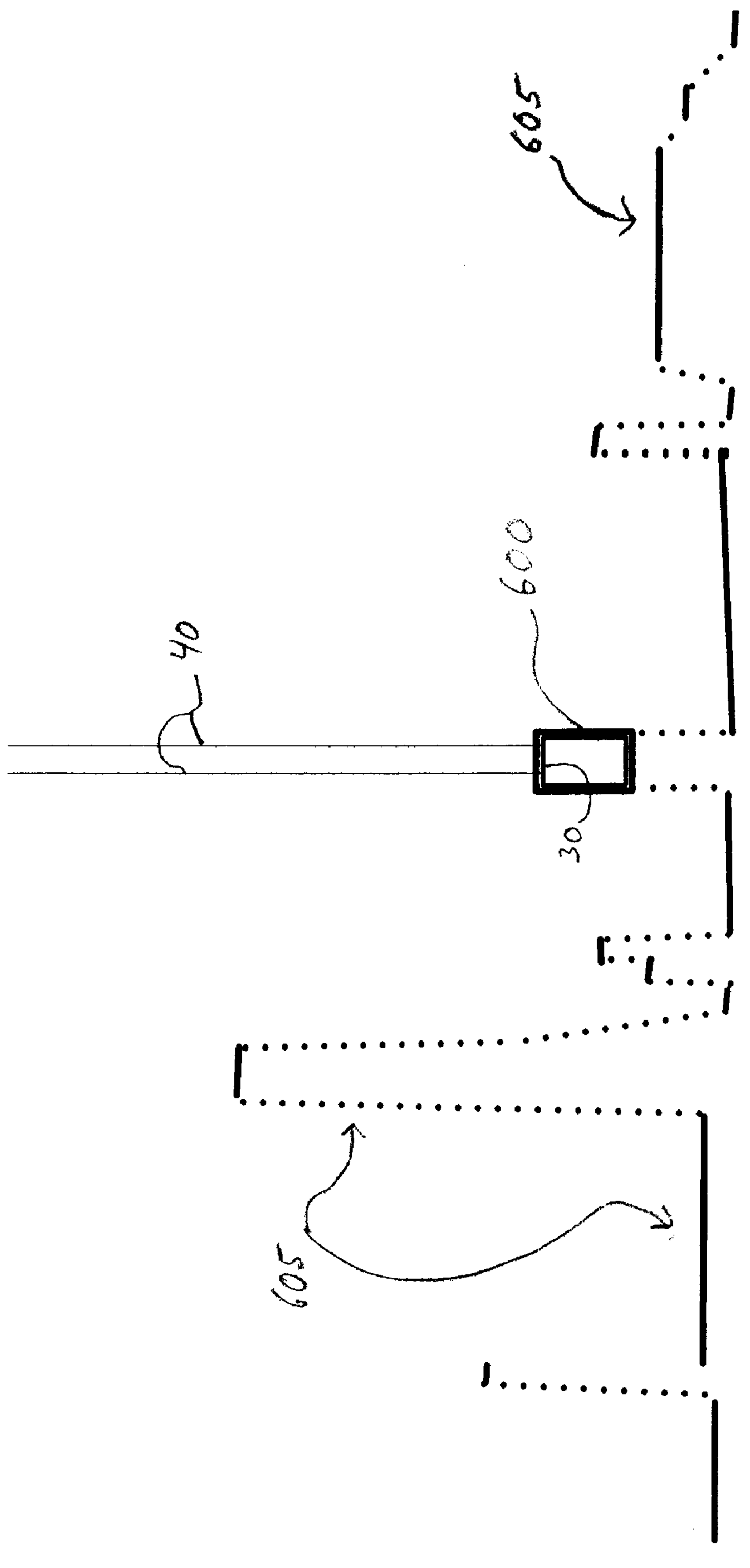

The protective envelope referred to throughout the foregoing description varies in size and shape depending on the horizontal and vertical speed of trolley 20 and hoist 25 as well as the dimensions of spreader 30 and its load. FIG. 5D illustrates a default protective envelope 600 established at 210 as it appears in path profile 605. FIG. 5C illustrates the configuration of a protective envelope 610 around spreader 30 as trolley 20 begins to traverse boom 15 on its way towards a load pickup. FIG. 5B illustrates the configuration of a protective envelope 610 around spreader 30 as it is lowered and approaches a load for pickup. FIG. 5A illustrates the configuration of a protective envelope 610 around spreader 30 after it has picked up its load and is moving back towards its drop destination.

The system and method of this invention are easily installed and configured with a minimal number of components. The system may be operated in all types of weather and is usable in lanes between crane legs and in the back reach. In addition, the system and method of this invention can be optionally implemented so as to impose appropriate speed limits solely on hoist motors or on trolley motors, thereby correcting only for potential protective envelope impingement along the vertical (Z axis) or horizontal (X axis), respectively. Similarly, users of this system may choose at any stage of operation to issue speed commands either to the hoist motor or to the trolley motor alone or to both of them simultaneously. Economic advantages include reduction in wear and tear on spreaders and wire ropes 40 connecting spreaders to a hoist, noise reduction with smoother operations and reduction in damage claims. Productivity is greatly enhanced since loading and unloading occur at maximum speeds and speed reductions only occur in the event a collision is imminent. This same productivity improvement results even for loading and unloading occurring within ship holds below deck where a crane driver has no visibility. Furthermore, by making the dimensions of the protective envelope dynamically adjustable during loading and unloading, there is no need to limit the speed of the trolley and hoist throughout the process as would be the case if static dimensions were established for the protective envelope. Moreover, although many decisions, calculations and adjustments disclosed in the preferred embodiment are presented as made by the crane operator, those same decisions, calculations and adjustments could also be automated so that the system could be more fully self-guided.

The foregoing invention has been described in terms of the preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. In particular, the method and apparatus of this invention may be adapted for use with any device used for transporting suspended loads from one location to another. The specification and examples are exemplary only, while the true scope of the invention is defined by the following claims.

What is claimed is:

1. A method for use with a gantry crane having a boom located above a known path, a trolley movably attached to the boom the movement of which along the boom is controlled by a trolley motor, a spreader having known default dimensions in the X and Z axes and attachment flippers said spreader being flexibly attached to and beneath the trolley the movement of which is controlled by a hoist motor with a known landing speed, a single transceiver emitting pulses at a known speed affixed to the trolley opposing the top surface of the spreader said transceiver being connected to a computer and a structured target attached to the top surface of the spreader, wherein the spreader transports a load type having known default dimensions in the X and Z axes from one position along a known path to a destination point along that known path, said method preventing collisions between the spreader together with a load attached thereto and objects in the known path based on the distance required to bring a moving spreader to a stop, comprising:

- building, by a processor, a dynamic first digital two-dimensional representation of a default rectangular protective envelope in the X and Z axes corresponding to the default X and Z axes dimensions of the spreader and the load attached thereto and storing that first representation in computer memory;
- continuously emitting transceiver pulses downward from the trolley across an arc along the known path;
- continuously receiving pulses at the transceiver reflected from the direction of the known path and the structured target;

continuously transmitting data representing the time lapse between emitted and received pulses and the angle from the perpendicular of each emitted pulse to the computer;
continuously constructing, by the processor, a dynamic second digital two-dimensional representation in the X and Z axes of the profile of the known path from the data received by the computer from the transceiver and storing that second representation in computer memory;
further continuously constructing, by the processor, a dynamic third digital two-dimensional representation in the X and Z axes of the location of the spreader relative to both the trolley and the path profile from data received by the computer from the transceiver and storing that third digital representation in computer memory;
transporting the spreader towards the destination point by issuing one or more first speed commands to the trolley motor or the hoist motor or both of them;
determining the sway of the spreader;
increasing the X axis dimension of the first digital representation by the amount of the sway;
continuously calculating stopping distances for the spreader and its load in the X axis and the Z axis;
modifying the X axis and the Z axis dimensions of the first digital representation, as required, to ensure that the respective stopping distances calculated in the X axis and the Z axis are encompassed within the dimensions of the first digital representation;
continuously comparing the first digital representation with the second digital representation;
when the comparison indicates an intersection of the first digital representation with the second digital representation,
  imposing a speed limit on the trolley motor when the intersection occurs in the X axis;
  further imposing a speed limit on the hoist motor when the intersection occurs in the Z axis;
  reducing the dimensions in the X and Z axes of the first digital representation concomitantly with the reduction in calculated stopping distances;
  when the first digital representation no longer intersects with the second digital representation, instructing the motor or motors on which a speed limit has been imposed to resume the speed called for by the first speed command and further increasing the dimensions in the X and Z axes of the first digital representation concomitantly with the increase in speed of the trolley motor or the hoist motor or both of them;
when the trolley is over the destination point, stopping the trolley motor;
reconfiguring the X axis dimension of the protective envelope to account for the absence of motion along that axis,
issuing a second speed command to the hoist motor;
measuring and storing the velocity of the spreader and its load in the Z axis;
verifying that the flippers are up;
  when the flippers are not up, stopping the hoist motor, raising the flippers and then obeying the second speed command;
  continuously comparing the second digital representation with the third digital representation;
  when the comparison indicates an intersection of the first digital representation with the second digital representation,
    imposing a speed limit on the trolley motor when the intersection occurs in the X axis;
    imposing a speed limit on the hoist motor when the intersection occurs in the Z axis;
    reducing the dimensions in the Z axis of the first digital representation concomitantly with the reduction in the calculated stopping distance in the Z axis;
    when the first digital representation no longer intersects with the second digital representation, instructing the hoist motor to resume the speed called for by the second speed command and further increasing the dimensions in the Z axis of the first digital representation, as necessary, concomitantly with the increase in speed of the hoist motor;
  when the spreader has reached the destination point, reducing the hoist motor speed to the landing speed and landing the spreader;
  when there are more loads to be transported, returning to transporting; and
  exiting the process.

2. The method of claim 1, wherein, after landing, when no load has been attached to the spreader, the method further comprises:
attaching a load to the spreader;
issuing a third speed command to the hoist motor and, when desired, a fourth speed command to the trolley motor;
determining the type of load attached to the spreader;
retrieving the dimensions of that load type from computer memory;
modifying the dimensions in the X and Z axes of the first digital representation to ensure that the respective stopping distances in the X axis and the Z axis are encompassed within the dimensions of the first digital representation;
when the destination point for the load has not been reached, returning to transporting;
otherwise, stopping both the trolley motor and the hoist motor;
reducing the X axis dimension of the first digital representation to the default dimension in the X axis for the spreader and the load type;
issuing a fifth speed command to the hoist motor;
further reducing the speed of the hoist motor and the Z axis dimension of the first digital representation as the destination point is approached;
when the third digital representation indicates that the distance between the load and the destination point is equal to the stopping distance margin, landing the spreader and the load;
otherwise, returning to further reducing; and
detaching the load;
when there are more loads to be transported, returning to transporting; and
exiting the process.

3. The method of claim 2 wherein determining the load type further comprises:
detecting the location of the edges of the spreader by analyzing data received from the transceiver in the computer;
assigning a new X axis dimension to the spreader based on the location of the edges;
comparing the new X axis dimension of the spreader with the larger of either the known default X axis dimension of the spreader or the known default X axis dimension of a container load;
when the new X axis dimension and the default X axis dimension are not approximately equal, further assigning the load type as a hatch cover; and
otherwise designating the load type as a container.

4. A method for use with a gantry crane having a boom located above a known path, a trolley movably attached to the boom, the movement of which along the boom is controlled by a trolley motor, a spreader having known default dimensions in the X and Z axes and attachment flippers, said spreader being flexibly attached to and beneath the trolley and the movement of which is controlled by a hoist motor positioned on the trolley having a known landing speed, a single transceiver emitting pulses at a known speed affixed to the trolley opposing the top surface of the spreader and connected to a computer and a target attached to the top surface of the spreader, wherein the spreader is capable of transporting a load type said load type being located on a ship either above deck or in one or more below deck storage cells each of which has known default dimensions in the X and Z axes, from one position along the known path to a destination point along that known path, said method preventing damage to the spreader when the load type is a ship hatch cover as opposed to a container and enabling differentiation between container loads and ship hatch cover loads wherein a stopping distance margin between the spreader and the load type is known, comprising:

building, by a processor, a dynamic first digital two-dimensional representation of a default rectangular protective envelope in the X and Z axes corresponding to the default X and Z axes dimensions of the spreader and storing that first representation in computer memory;

issuing a downward speed command to the hoist motor;

lowering the spreader at the velocity specified by the downward speed command;

verifying electronically that the flippers are up;

when the flippers are not up, stopping the hoist motor and raising the flippers;

otherwise, resuming the downward speed of the hoist motor;

continuously emitting transceiver pulses downward from the trolley across an arc along the known path;

continuously receiving pulses reflected from the direction of the known path and the target;

continuously transmitting data representing the time lapse and angle between emitted and received pulses to the computer;

continuously constructing, by a processor, a dynamic second digital two-dimensional representation in the X and Z axes of the profile of the known path from the data received by the computer from the transceiver and storing that second representation in computer memory;

further continuously constructing, by a processor, a dynamic third digital two-dimensional representation in the X and Z axes of the location of the spreader relative to both the trolley and the path profile from the data received by the computer from the transceiver and storing that third digital representation in computer memory;

determining whether the third digital representation is within the stopping distance margin of the destination point;

when it is, reducing the hoist motor speed to the landing speed until landing occurs otherwise, returning to determining;

attaching a load type to the spreader;

issuing an upward speed command to the hoist motor;

beginning to raise the spreader and the load type at the velocity specified by the upward speed command;

detecting the location of the edges of the spreader in the X axis by analyzing data received from the transceiver in the computer;

assigning a new X axis dimension to the spreader based on the location of the edges;

comparing the new X axis dimension of the spreader with the larger of either the known default X axis dimension of the spreader or the known default X axis dimension of a container load;

when the new X axis dimension and the default X axis dimension are not approximately equal, further assigning the load type as a hatch cover; and otherwise designating the load type as a container.

5. The method of claim 4 further comprising after assigning the load type as a hatch cover:

when the current load type is a hatch cover, determining a first distance in the Z axis between the spreader and the transceiver;

designating the first distance as the deck height; and adjusting the second digital representation to indicate that the first distance is approximately equal to the distance to the top of a container load in a below deck storage cell.

6. The method of claim 5 further comprising after assigning the load type as a container:

when the previous load type was a hatch cover and there are more containers in the below deck storage cell exposed by removal of the hatch cover, comparing the position of the spreader in the third digital representation in the Z axis with the deck height; and when the spreader position exceeds the deck height by approximately 3 meters, stopping movement of the spreader in the Z axis by stopping the hoist motor until electronic verification is obtained confirming that the flippers are in an up position.

7. The system of claim 4 wherein the type of pulses emitted and received by the transceiver is one selected from the group consisting of light, radio frequency and sound.

8. The system of claim 4 wherein the shape of the target is one selected from the group consisting of triangular prism and pyramid.

* * * * *